G. A. H. KELLNER.
STEREOSCOPIC APPLIANCE.
APPLICATION FILED AUG. 7, 1909.
1,169,163.
Patented Jan. 25, 1916.
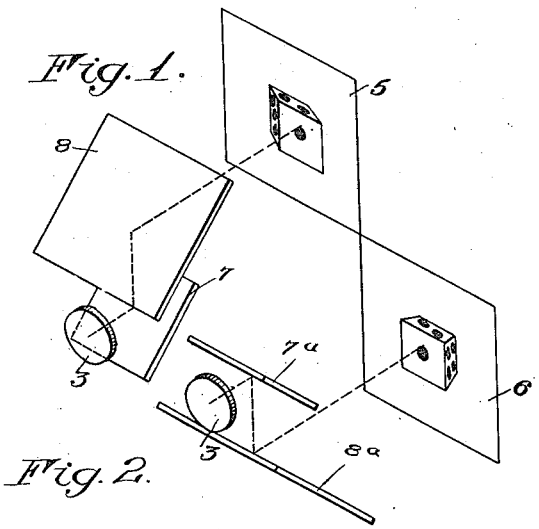
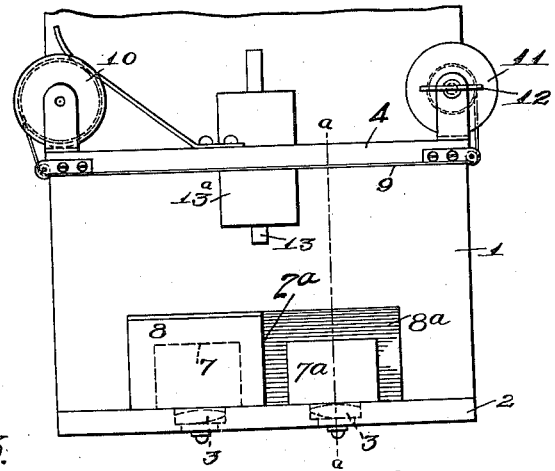
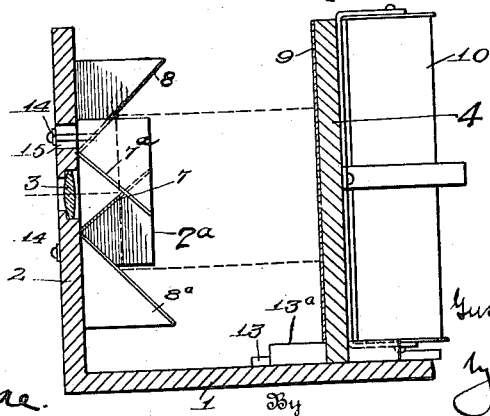

UNITED STATES PATENT OFFICE.

GUSTAV A. HERMANN KELLNER, OF ROCHESTER, NEW YORK, ASSIGNOR TO BAUSCH & LOMB OPTICAL COMPANY, OF ROCHESTER, NEW YORK, A CORPORATION OF NEW YORK.

STEREOSCOPIC APPLIANCE.

1,169,163.       Specification of Letters Patent.       Patented Jan. 25, 1916.

Original application filed May 31, 1907, Serial No. 376,515. Divided and this application filed August 7, 1909. Serial No. 511,743.

*To all whom it may concern:*

Be it known that I, GUSTAV A. HERMANN KELLNER, of Rochester, in the county of Monroe and State of New York, have invented certain new and useful Improvements in Stereoscopic Appliances; and I do hereby declare the following to be a full, clear, and exact description of the same, reference being had to the accompanying drawings, forming a part of this specification, and to the reference-numerals marked thereon.

The present invention relates to stereoscopic appliances such as stereoscopes and stereoscopic cameras, this application being a division of an application for Letters Patent having matured into Patent No. 933,844, issued September 14, 1909.

The object of the invention is to provide a construction in which the images are viewed or taken one above the other so that they may be arranged upon a strip of material which is moved to produce a panoramic effect.

To these and other ends the invention consists in certain improvements and combinations of parts all as will be hereinafter more fully described, the novel features being pointed out in the claims at the end of the specification.

In the drawings the invention is shown as embodied on a stereoscope, Figure 1 being a diagrammatic view thereof; Fig. 2 being a top view, and Fig. 3 being a sectional view one line *a—a* of Fig. 2.

The stereoscope herein shown embodies a suitable support or base 1 having a front board or other suitable member 2 formed with view openings in which are preferably arranged suitable collective lenses 3. The base may also carry the image holder 4 adapted to support the two images in the same vertical plane.

The optical relation between the images and the lenses or view openings is maintained by a series of deflectors suitably arranged so that two picture units 5 and 6 will be displaced or transposed into apparent optical coincidence. In the embodiment herein shown the two picture units are arranged in different horizontal planes and the pencil in one instance passes from a lens to a reflector or reflecting surface 7 arranged at an angle of 45° to the image, thence upwardly to a reflector 8 arranged parallel to the reflector 7 and finally to the image 5. The reflectors for the other pencil are inclined oppositely to the first reflectors and the pencil passes horizontally from the other lens to a reflector 7$^a$, thence downwardly to a reflector 8$^a$ and finally horizontally to the image 6. The images in this instance are arranged one above the other on a picture strip 9 which may be mounted on rollers or spools 10 and 11 and shifted past the lenses by any suitable means, such for instance as by thumb piece 12. The image holder which carries the rolls may be adjusted in the direction of the optical axis of the device, and for this purpose a guide block 13 on the bed operates in the guide piece 13$^a$ on the image holder. Of course for images of different sizes, the relation of the parts will have to be changed and with this object in view there is provided means permitting the shifting of the axis of those portions of the pencils extending between the objects and the mirrors 8, 8$^a$ to position said pencils centrally of the images so that after the pencils are reflected into the mirrors 7, 7$^a$ and thence into the lenses, the centers of the objects may appear centrally in the lenses. To this end, the reflectors 8 and 8$^a$ are shown as mounted on triangular blocks which are adjustably held in position by screws 14 working in slots 15. Between the two sets of lenses and reflectors is arranged the usual partition, 2$^a$ mounted on the front board 2, which prevents any crossing of the light rays from either objects into the lenses in front of the other object.

A stereoscope constructed in accordance with this invention permits the arrangement of the picture units on a strip from which they are transposed or displaced into optical coincidence without distortion or foreshortening of the images.

It is understood that the term "lenses" herein employed is used for the purpose of including the lenses of a camera or the lenses of a stereoscope, and that the term "image holder" is employed as generic to a negative holder of a stereoscopic camera or a picture holder of a stereoscope.

I claim as my invention.

1. A stereoscope adapted to hold a picture comprising picture units that are arranged in different horizontal planes, and provided with reflecting surfaces which are so arranged that they will displace said picture units into apparent optical coincidence; substantially as described.

2. A stereoscope provided with means for supporting a picture comprising images or picture units located in different horizontal planes, lenses and reflecting surfaces so arranged relatively to the lenses that they will displace the images or picture units of said picture into apparent optical coincidence; substantially as described.

3. A stereoscope provided with lenses, a picture comprising picture units that are arranged in different horizontal planes, and reflecting surfaces for displacing said picture units into apparent optical coincidence; substantially as described.

4. A stereoscope provided with means for holding a picture that comprises a pair of picture units arranged in different horizontal planes, said stereoscope being provided with inclined reflecting surfaces which cause both picture units to appear to be in optical coincidence; substantially as described.

5. A stereoscope provided with lenses, and a pair of parallel reflecting surfaces coöperating with each lens for displacing images or pictures located in different horizontal planes into apparent optical coincidence; substantially as described.

6. A stereoscope provided with lenses, an inclined reflecting surface coöperating with one lens and an oppositely inclined reflecting surface coöperating with the other lens so as to displace pictures or images located in different horizontal planes into apparent optical coincidence; substantially as described.

7. A stereoscope provided with lenses, and a pair of parallel inclined reflecting surfaces coöperating with each lens, the reflecting surfaces for one lens being inclined oppositely to the reflecting surfaces for the other lens so that pictures or images located in different horizontal planes will be displaced into apparent optical coincidence; substantially as described.

8. A stereoscope provided with a picture that is composed of two picture units located in different horizontal planes, and two pairs of reflecting surfaces arranged in front of the picture and so disposed relatively thereto that both picture units will appear to lie in the same horizontal plane; substantially as described.

9. A stereoscope comprising a member provided with lenses, a picture holder arranged in front of said member for supporting a picture made up of picture units that are located in different horizontal planes, and reflecting surfaces for deflecting said picture units into apparent optical coincidence; substantially as described.

10. A stereoscope comprising a member provided with lenses and a pair of inclined reflecting surfaces arranged in front of each lens, the reflecting surfaces for one lens being disposed oppositely to the reflecting surfaces for the other lens, a picture-holder arranged in front of said reflecting surfaces, and a picture strip mounted in said holder and provided with picture units that are located in different horizontal planes; substantially as described.

11. A stereoscope comprising lenses, a picture strip containing picture units that are located in different horizontal planes, means for moving said picture strip transversely of the lenses, and reflecting surfaces coöperating with the lenses to displace said picture units into apparent optical coincidence; substantially as described.

12. In a stereoscopic appliance, the combination with an object holder, and a pair of lenses, of deflectors for the pencils of rays, between the lenses and the object holder arranged to transpose the images of said objects located in different horizontal planes and means permitting the relative shifting of the axes of the pencils for images of different sizes.

GUSTAV A. HERMANN KELLNER.

Witnesses:
RUSSELL B. GRIFFITH,
HAROLD H. SIMMS.